C. Neumann.
Hoop Skirt.
No. 1703 Reissued Jun. 14, 1864.
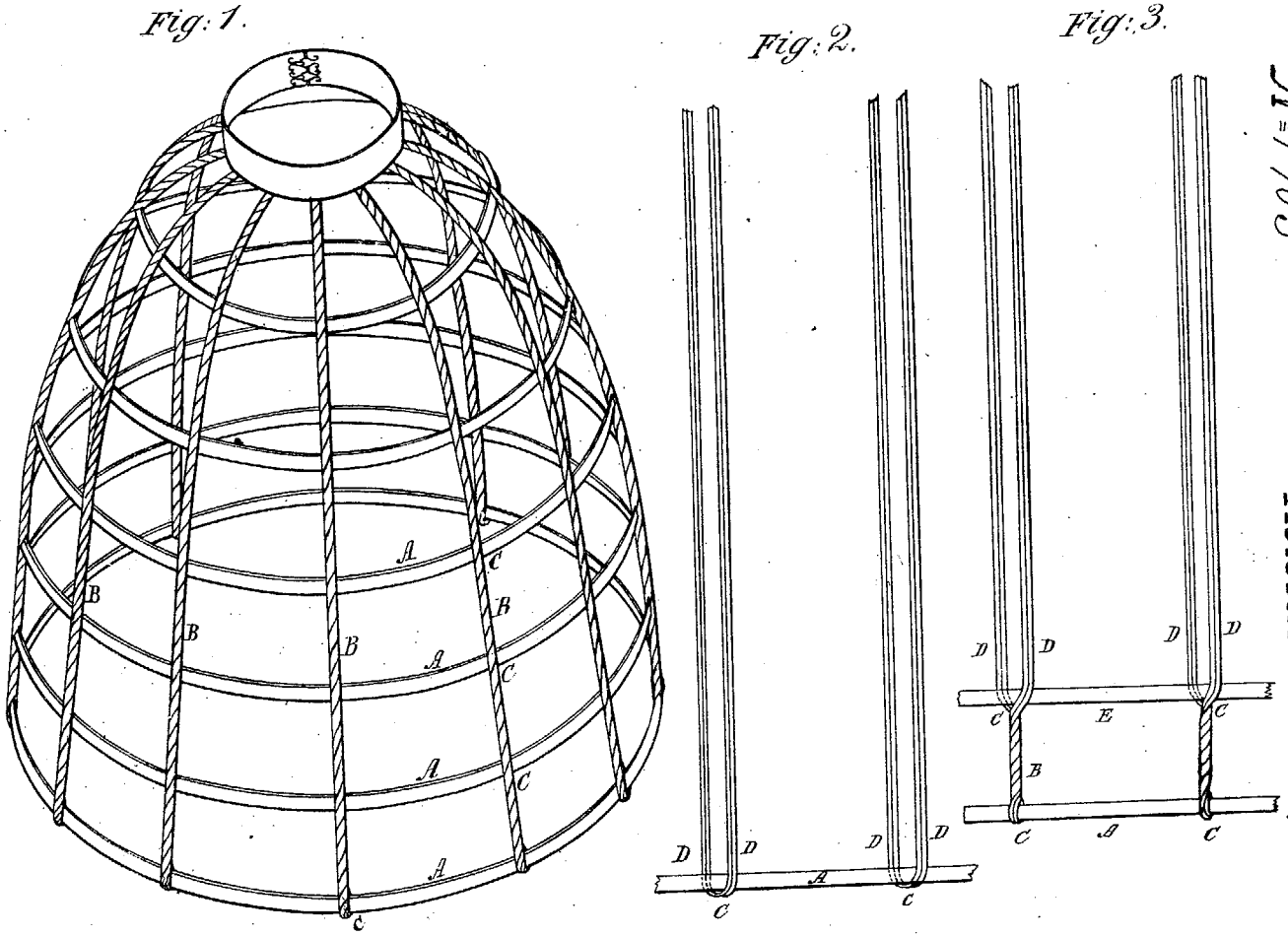
Witnesses.
Elkan Levinger
A. Sidney Doane
Inventor
Caesar Neumann

UNITED STATES PATENT OFFICE.

CÆSAR NEUMANN, OF NEW YORK, N. Y.

IMPROVEMENT IN HOOP-SKIRTS.

Specification forming part of Letters Patent No. 25,797, dated November 1, 1859; Reissue No. 991, dated June 26, 1860; Reissue No. 1,703, dated June 4, 1864.

*To all whom it may concern:*

Be it known that I, CÆSAR NEUMANN, of the city, county, and State of New York, have invented a new and useful Improvement in Hoop-Skirts; and I do hereby declare that the following is a full, clear, and exact description of the same, reference being had to the accompanying drawings, forming a part of this specification, in which—

Figure 1 represents a perspective view of a hoop-skirt constructed according to my invention. Figs. 2 and 3 are detached views of portions of the skirt in different styles of the manufacture.

Similar letters of reference in the three views indicate corresponding parts.

The object of this invention is to cheapen the manufacture of skeleton skirts by superseding the expensive modes of making the same which have been heretofore used, and in which tape and similar materials are combined with hoops by means of metal clasps or fastenings, or by sewing said tapes to the covered springs, or by sewing loops in tapes to insert the springs, or forming loops therein by the expensive process of weaving, all of which is avoided by my present process of substituting for said tapes or other like articles simple cord braided or twisted either before or during the operation of making the skirt, and made by hand or by machinery.

In manufacturing a skirt according to my improvement, I take a series of cords, D, and double them up, as shown in Fig. 2 of the drawing, and pass the lowest hoop, A, through between the strands of the several cords. After this hoop has been thus adjusted, I twist or braid the cords a sufficient distance, as shown at B, in Figs. 1 and 3, and in the bights C I place the second hoop, and so on until the skirt is finished. The braiding or twisting of the cords between the consecutive hoops may be effected by hand or by machinery; or the cord used may be made before it is combined with the hoops, said hoops being inserted in a bight or loop in the cord, however, made to combine the two; or the cords may be fastened to the covering of the hoops by sewing, or connected with the same in any other suitable manner.

The number of the hoops and cords may, of course, be varied according to the quality of the article manufactured, and the cords may be arranged in parallel lines or in any other figures, according to the fancy of the manufacturer.

It is obvious that this mode of connecting the spring-hoops of a skirt admits of a great rapidity of construction, and is much cheaper than the former systems of fastening by clasps or by sewing or weaving in.

What I claim as a new, and desire to secure by Letters Patent, is—

A hoop-skirt having its hoops supported by cords twisted or braided either before or during the manufacture of the skirt, substantially as herein shown and described.

CÆSAR NEUMANN.

Witnesses:

M. M. LIVINGSTON,

GEO. W. REED.